United States Patent [19]

Schifferly

[11] 4,262,727

[45] Apr. 21, 1981

[54] AUTOMATIC TIRE MOUNTING AND DEMOUNTING MACHINE

[76] Inventor: Richard E. Schifferly, 9717 Waterville-Npls Rd., Waterville, Ohio 43566

[21] Appl. No.: 2,030

[22] Filed: Jan. 8, 1979

[51] Int. Cl.³ .............................................. B60C 25/06
[52] U.S. Cl. ................................................. 157/1.24
[58] Field of Search ...................... 157/1.1, 1.17, 1.2, 157/1.22, 1.24

[56] References Cited

U.S. PATENT DOCUMENTS

| | | | |
|---|---|---|---|
| 2,569,789 | 10/1951 | Weaver | 157/1.24 |
| 2,661,053 | 12/1953 | Mullen | 157/1.1 |
| 2,665,747 | 1/1954 | Harrison | 157/1.24 X |
| 2,900,017 | 8/1959 | Lewis | 157/1.22 |
| 2,900,018 | 8/1959 | Harrison | 157/1.24 |
| 3,545,463 | 12/1970 | Mueller | 157/1.24 |
| 4,061,173 | 12/1977 | Daly | 157/1.24 X |

FOREIGN PATENT DOCUMENTS 492250 7/1919 France ............................ 157/1.24

Primary Examiner—James G. Smith
Attorney, Agent, or Firm—George R. Royer

[57] ABSTRACT

An automatically actuated tire mounting and demounting machine flexibly equipped for mounting tires on rims of all configuration, said machine comprising coordinated working elements which mount a resiliently composed tire on a rim and simultaneously inject air pressure into the tire interior as the tire is at the final steps of its mounting process. Moreover, the machine incorporating the subject invention comprises a base member upon which a tire mounting block is affixed, this tire mounting block being so structured to receive a bare tire rim in a horizontal position for installation of the tire member thereon. Located above the tire mounting block are a pair of parallel and downwardly depending complementary working arms, with free-rolling members thereon of cylindrical configuration and variable diameters which latter arms move in complementary opposing arcuate movements circumferentially above and around the tire rim, but inside the tire bead, so as to facilitate the mounting of the tire on the rim in circumferential fashion. Within the tire mounting block are dual air injection systems which function to induce air into the tire interior simultaneously with the process of mounting the tire as described above.

5 Claims, 10 Drawing Figures

U.S. Patent  Apr. 21, 1981  Sheet 1 of 5  4,262,727
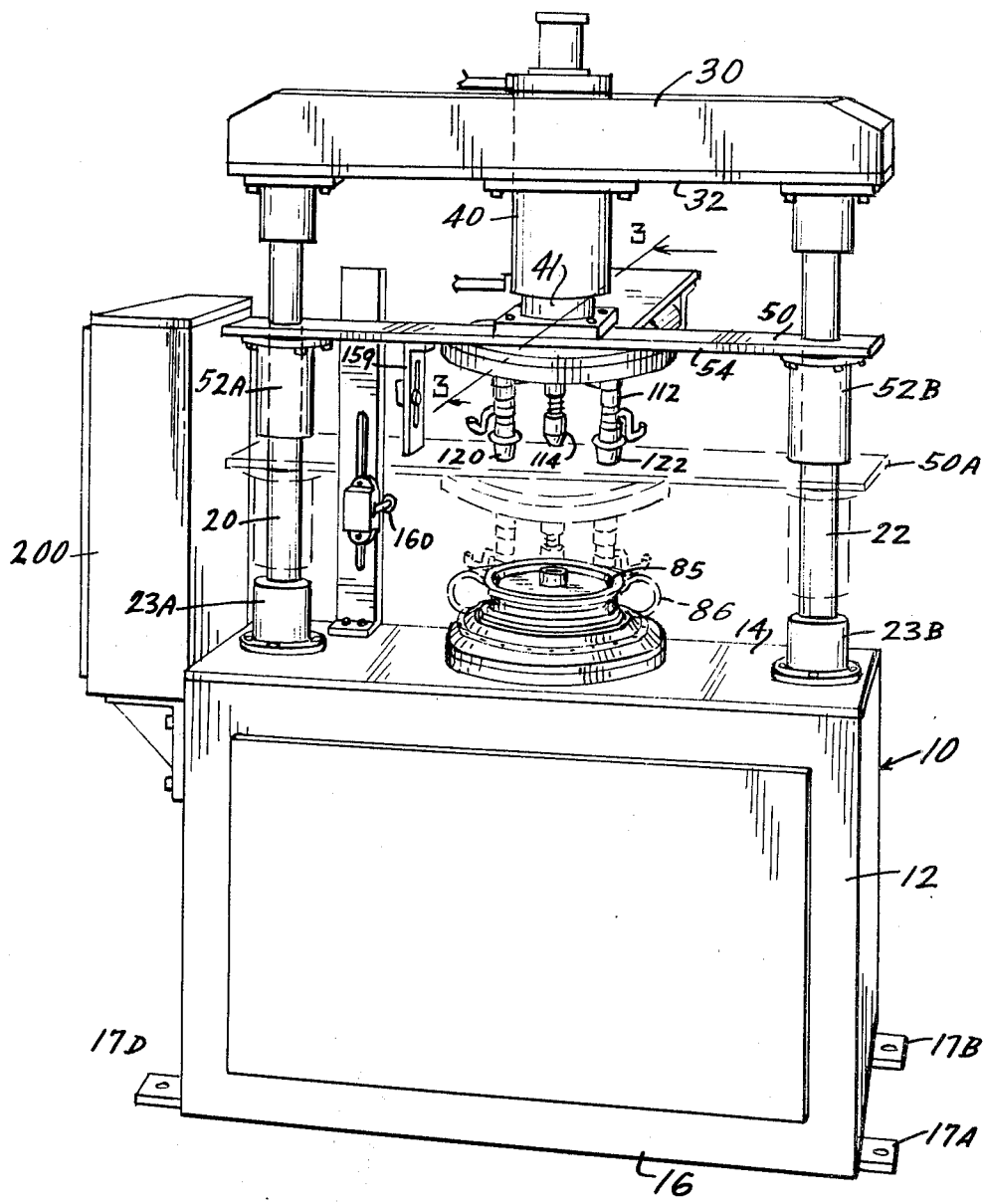
FIG-1-
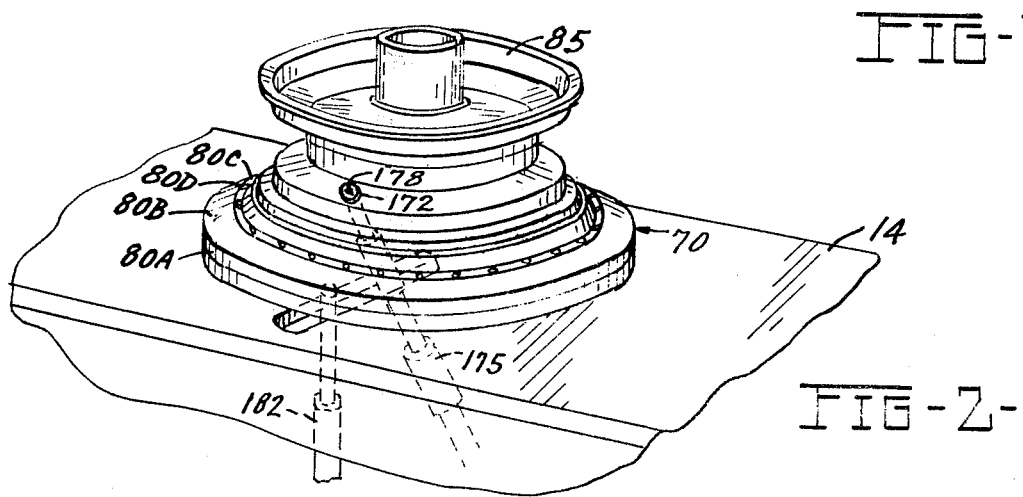
FIG-2-

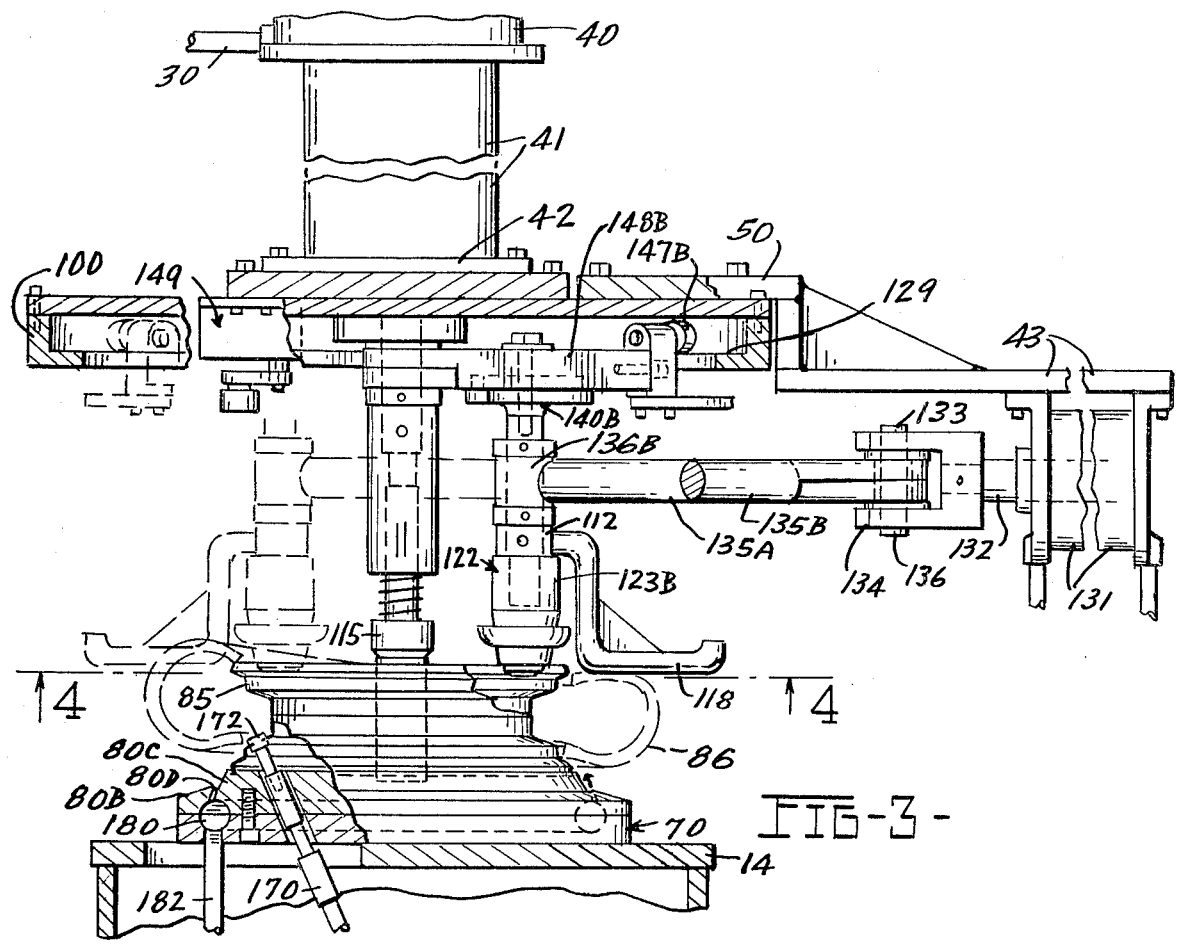
FIG-3-
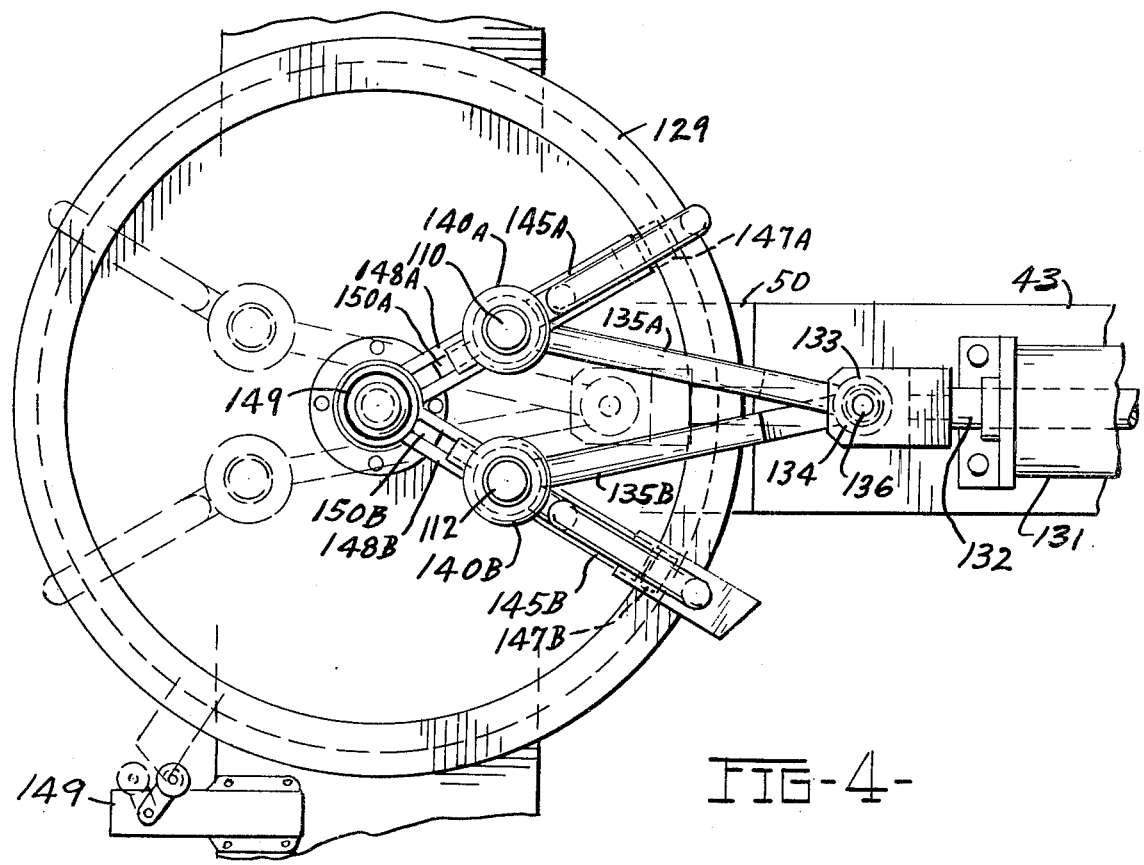
FIG-4-

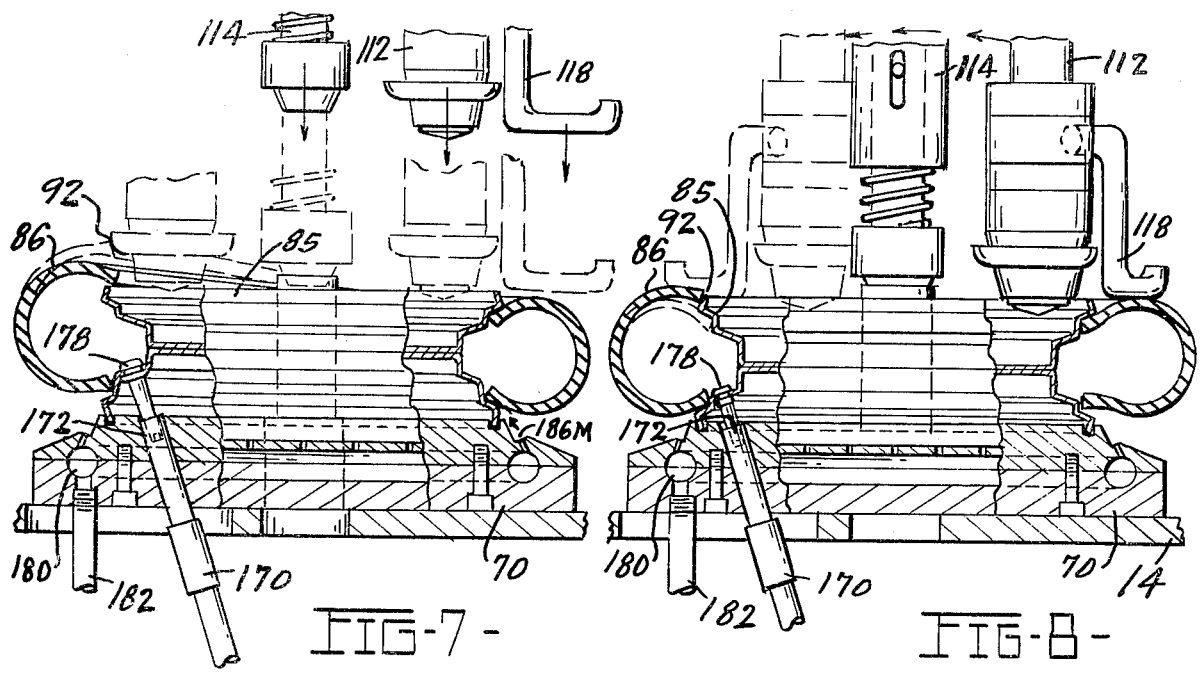
FIG-7-    FIG-8-
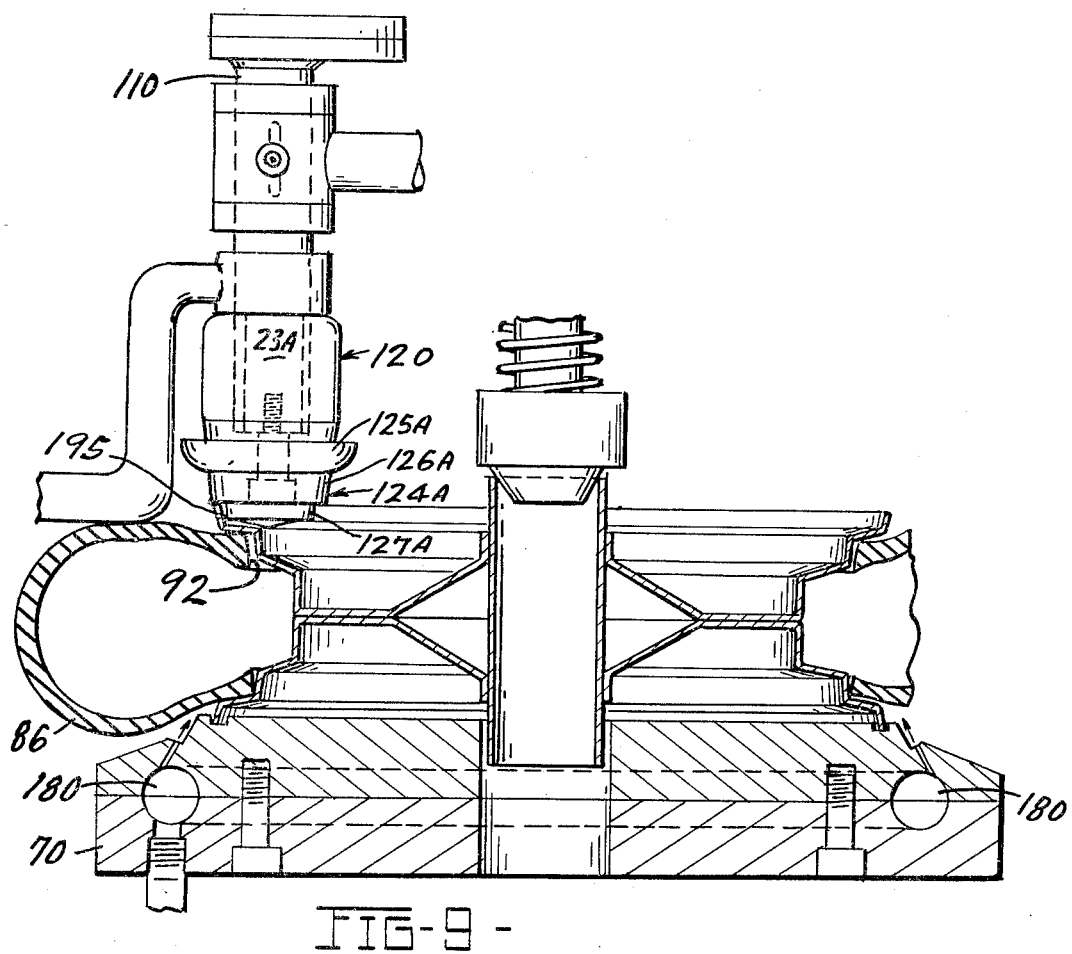
FIG-9-

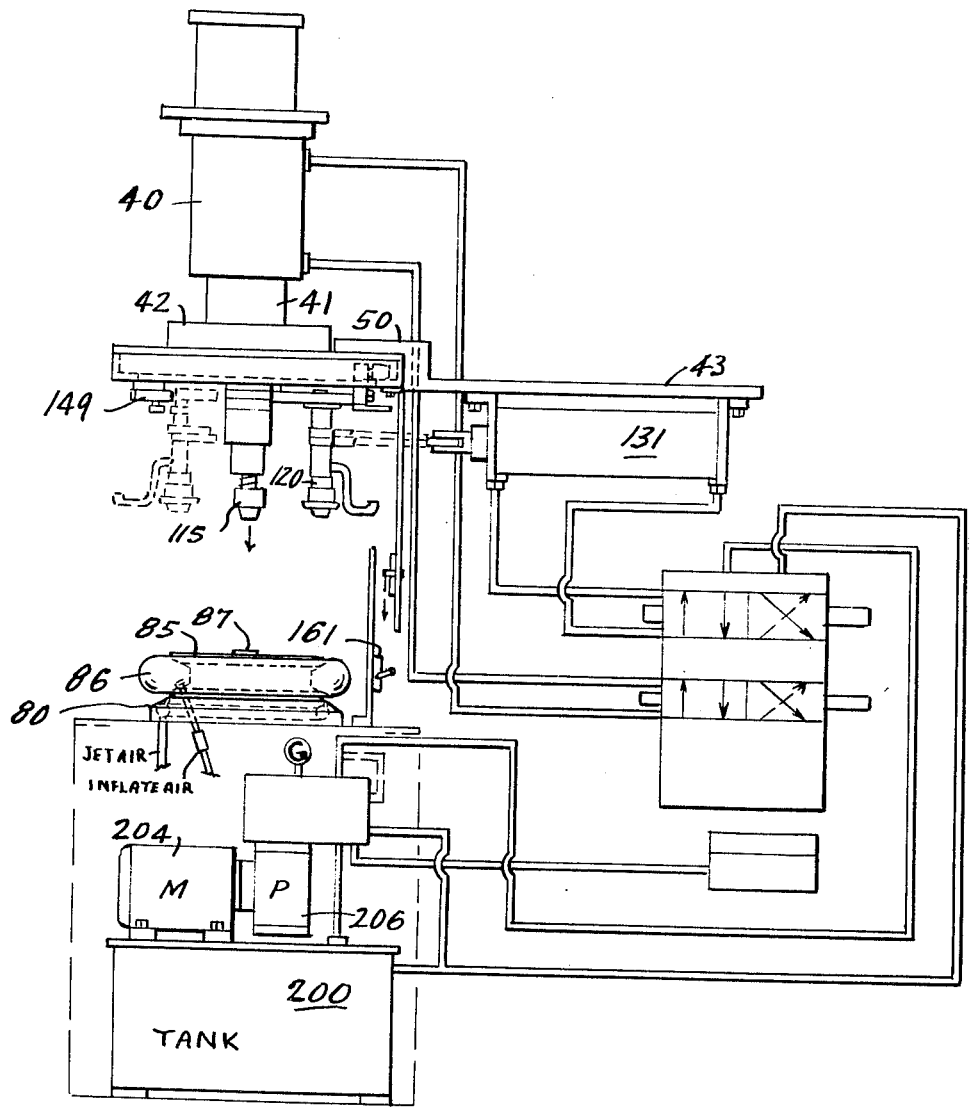
FIG-10-

AUTOMATIC TIRE MOUNTING AND DEMOUNTING MACHINE

KNOWN PRIOR ART

U.S. Pat. No. 2,900,018.

DISCUSSION OF PRIOR ART AND BACKGROUND OF INVENTION

The process of automatically or semiautomatically mounting pneumatic tires onto rims is performed by various methods and machines. The procedure involves, among other aspects, the difficult procedure of completing the sealing of the tire against the rim in order that intermittent air injected into the tire does not escape between the bead of the tire and the tire rim. Moreover, there is the added problem of ensuring that the machine mounting arms do not become entangled between the tire rim and the tire bead during or just after the mounting process. Several other operational problems are of prime consideration in the employment of automatic tire mounting machines. Some tire mounting machines known in the art have been conceived and utilized to overcome these problems. As indicated hereinbelow, the pertinent machines known in the art have not been of sufficient capability and versatility to solve these problems.

There have been a myriad number of machines conceived and used for automatic tire mounting purposes. In this light, there have been a number of machines manufactured on which tire is temporarily stretched by automatic means so that it can fit around the circumferential extent of the rim, with said automatic stretching force then being released as the tire appropriately fits circumferentially onto the rim. This latter machine process simply and solely affixes the tire circumferentially onto the rim so that it is properly positioned for the next successive step, namely the injection of air into the space between the rim and the tire. Such machines are generally not fully automatic and involve the necessity of the mentioned separate steps, of mounting and inflating the tire. As a consequence of such a dual step arrangement, the costs of operation are relatively high.

The known machines in the prior art that automatically install tires around a rim are, as stated above, substantially varied; however, there does not exist in the prior art a machine which combines as a simultaneous operation the process of mounting the tire on the rim concurrently with the tire inflation procedure. Without known exception, all such automatic machines either are limited to the singular step of mounting the tire, with a separate machine required for the air injection process. On the other hand there are existing machines in which these two steps are separately consummated on a single machine having correspondingly separate functional stations. Clearly, if either a two-step machine is used, or alternately two machines used for these two respective steps, there would be a resultant problem of inefficiency in view of the additional time, energy, and manpower requirements to consummate these additional steps. Consequently, a machine which reduces these time and manpower requirements by combining the two separate steps of optimal mounting and pressurizing into a simultaneous operation would obviously yield significant savings in the overall procedure.

Yet another consideration that has proven to be a limitation in the known employment of automatic tire mounting machines is the aspect wherein mounting arms, in almost all known machines of the type herein, are positioned and structured such that they are juxtaposed above but between the tire rim and the bead of the tire. This positioning invariably causes difficulties in the tire mounting process and is undesirable from this perspective. Moreover, still another aspect of known automatic tire mounting machines is that such machines are generally equipped with mounting arms and working elements, for the precise mounting functions, that are not capable, by structure, is mounting tires on rims of variable shape, i.e. capable of mounting on both flanged and return flanged rims. Such limitations substantially restrict the flexibility of a tire mounting machine and impose limitations accordingly. The subject invention is conceived and adapted to solve the foregoing problems with a machine that is generally more versatile and flexible in automatic tire mounting operations for tire rims and tires of variable shapes and sizes. The following objects are directed accordingly.

OBJECTS

In view of the foregoing discussion of the prior art, the following are objects of the subject invention:

It is an object of the subject invention to provide an improved tire mounting machine;

It is also an object of the subject invention to provide a tire mounting machine which incorporates the process of mounting the tire on the rim with the substantially simultaneous step of inflating the tire;

Yet another object of the subject invention is to provide a tire mounting machine which is flexible and versatile in adaptation for mounting tires on rims of all shapes.

A further object of the subject invention is to provide an improved process for automatic tire mounting;

Still another object of the subject invention is to provide an efficiently operated tire mounting machine;

A further object of the subject invention is to provide a tire mounting machine which incorporates as a single step, single station operation, the process of both mounting the tire and inflating it simultaneously;

Another object of the subject invention is to provide a more efficient process of mounting a tire on a machine;

An additional object of the subject invention is to provide improved and relatively more versatile tire mounting arms;

Another object of the subject invention is to provide an improved tire mounting arm mechanism;

Yet another object of the subject invention is to provide an improved device for the injection of air into the mounted tire for inflating same;

Still another object of the subject invention is to provide an improved process for injecting air into the tire during the tire mounting process.

Other and further objects of the subject invention will become apparent from a reading of the following description taken in conjunction with the claim.

DESCRIPTION OF DRAWINGS

In the drawings:

FIG. 1 is an frontal perspective view of the machine incorporating the subject invention;

FIG. 2 is a perspective view of the tire mounting block shown with a tire rim thereon ready for the mounting process;

FIG. 3 is a front elevational view, of the tire mounting arms and mounting mechanism with the overall arm activating members shown in their particular operational stages;

FIG. 4 is a elevational view, from the bottom of the arm actuating mechanism and the circular track mechanism which constrains the movement of the mounting arms to respectively complementary, opposing arcuate movements;

FIG. 7 is a side elevational view, in section, of the tire mounting system;

FIG. 8 is the same cross sectional view as shown in FIG. 7, but with the tire shown as being mounted;

FIG. 9 is an enlarged view of an alternate embodiment of the subject invention;

FIG. 10 is a schematic drawing of the hydraulic system used in the subject invention.

The subject invention as shown in the foregoing drawings is a one-station tire mounting machine in which a tire is mounted on a rim and simultaneously inflating the tire at a single station. A general overview of the drawings reveals the overall tire-mounting procedure. A bare rim is placed on the tire mounting block, as shown in FIGS. 2 and 5. Once the rim is so juxtaposed, a flexible tire is placed over the rim in a slightly inclined position, as shown in FIG. 7. Specifically, one part of the tire is fitted between the rim extremities, as shown in FIG. 7, and the other part of the tire is placed over the top of the forward part of the rim, as shown, with only the lower tire bead fitting over the upper forward portion of the rim. Once the tire is so positioned, the operational switch is activated causing the intermediate frame shown in FIG. 1 to lower the mounting arms into the working position shown in FIGS. 3 and 6. As the intermediate frame is lowered into working position, the apparatus shown in FIG. 4 moves forward, or to the left as represented in FIG. 4, thereby causing the mounting arms to progressively engage the tire bead and install it around the tire rim. FIGS. 6 and 8 show a tire fully installed around the rim.

Figure 5:
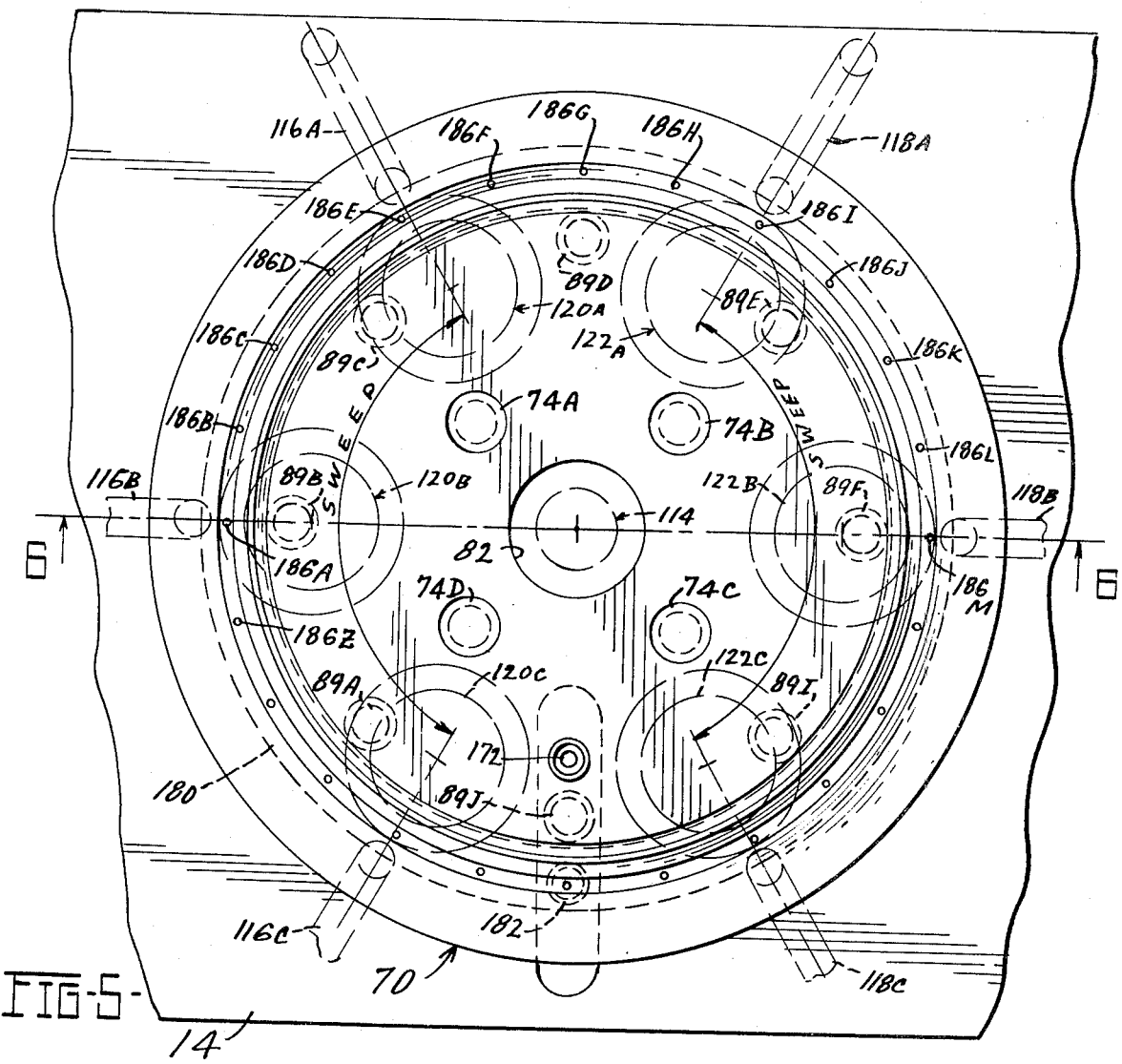
FIG. 5 is a top sectional view of the tire mounting block used in the subject invention.

The following description will specifically describe the detailed attributes and mechanism of this tire mounting apparatus.

DESCRIPTION OF GENERAL EMBODIMENT

The subject invention is an automatic tire mounting and inflating machine. The machine incorporating the subject invention is comprised of a base member upon which is mounted a working platform of horizontal disposition. The base member, generally adapted to rest on the floor, has two vertical support pillars, one of each end of the base member, said pillars extending up through said base member and above the upper level of the working platform. These vertical pillars function to support the working and mounting members which are positioned above the working platform.

Slidably mounted on the vertical pillars, at a position above the working platform is a horizontally disposed frame member capable of reciprocating up and down on said pillars. A horizontal beam member joins the uppermost portions of the vertical pillars as a support beam. A downwardly depending hydraulic pistion is affixed to the underside of the horizontal beam member and this hydraulic cylinder is affixed to the upper surface of the slidable frame member, and thus serves to actuate the reciprocal movement of the horizontal frame member.

Affixed on the upper surface of the horizontal working platform at the top of the base member, is a circular tire mounting block, said block being structured to hold a tire rim thereon while the tire is being mounted on the rim. Specifically, the tire mounting block lies flush in a horizontal position against the upper surface of the working platform, and is structured and so positioned so as to receive a tire rim in a horizontal, and not upright position. The tire is mounted in the rim while the rim is in this horizontal position. Additionally, the tire mounting block is equipped with dual air injection systems, as more fully described below, to fill the tire with air during the latter phases of the tire mounting operation.

Affixed to the underside of the slidably mounted horizontal frame member is the functional and moving members which operate to mount the tire on the rim. In particular, the tire mounting mechanism is comprised in part of three vertically depending arms, all mutually parallel, which are affixed to the undersurface of the horizontal frame member. The central or intermediate arm is a combined centering and holding arm which is positioned above the center of the rim, and as the horizontal frame is moved downwardly, this centering and holding arm, simply referred to as the centering arm, moves downwardly a corresponding distance to a position on top of the rim center, thereby centering and holding the rim securely against the tire mounting block while the tire is being mounted thereon. Positioned on each side of the vertical hold down arms are the two vertically depending working arms, each of equal length. Rotatably mounted on the lower end of each working arm is a roller member which is adapted and affixed to freely rotate about the vertical, longitudinal central axis of the working arm. Each roller member is basically a cylindrical member and has variable diameters along its vertical extent. Alternately stated, each roller, has circular shoulder members, extending completely around the periphery of the roller, such shoulder members having diameters which are larger or smaller than the basic diameter of the roller itself. The functions of these respective shoulders is described as follows:

The uppermost shoulder on each roller member is larger in diameter than the basic roller diameter. As the working arm is lowered to the metal rim, this upper shoulder functions to help expand the tire bead, the internal diameter of the tire, so that the tire can fit around the outside of the tire rim. This enlarged shoulder also functions to hold the trailing edge of the tire bead and keep said trailing edge down while the tire mounting process evolves.

Immediately beneath the enlarged roller are two circular shoulders each with a diameter somewhat smaller than the basic diameter of the roller. The uppermost of these two lower shoulders, referred to as the intermediate shoulder, is tapered into a relatively smaller diameter as it extends downwardly. The external peripheral surface of this intermediate shoulder is rounded in a slightly convex fashion. The leading edge of this intermediate shoulder rides against the bead of the tire; and by reason of its convex, tapered peripheral contour, serves to force the bead of the tire downwardly and outwardly such that the tire bead fits outside the rim but also downwardly below the upper exposed rim.

The lower shoulder on roller is the lowermost functional shoulder on the roller. It is also the smallest in diameter of the three functional shoulders on the roller. Specifically, the lowermost shoulder is smaller in diameter than the intermediate shoulder, and is disposed just immediately beneath the intermediate shoulder. This lower shoulder is also slightly tapered to a smaller diameter as it extends downwardly to its lowermost extreme, and moreover, the lower shoulder is also slightly convex on its peripheral surface. Functionally, the lower shoulder rides against the inside diameter of the tire rim and basically serves thereby to maintain the roller inside the tire rim inner diameter so that the roller does not become positioned at any time between the tire bead and the outside of the rim. This latter functional aspect maximizes the efficiency of the working arms and minimizes any interference problems.

In general the three shoulders on each roller member are three distinct elements on the roller, and the areas at which these shoulders meet are distinctly defined neck areas wherein the lowermost portions of the respective shoulders are horizontally disposed or flat zones. This latter feature helps to distinctly define the three respective shoulder members and prohibits functional and operational interference between these respective shoulder members.

The two tire mounting arms, with their respective revolving rollers thereon, are movable through two complementary, opposing arcuate sweeps of approximately 120 degrees each. Specifically, each arm swings from a position, in close proximity to one another, at the rear side of the working platform to opposing arcuate movements about the circular rim, one arm moving clockwise and one arm moving in a counterclockwise complementary movement. As a result of these latter complementary arcuate sweeps, the two arms move cooperatively, upon actuation of integrally coordinated hydraulic means, over substantially a 270 degree sweep around the tire rim. A circular track integrally affixed to the underbelly of the horizontal frame directs and constrains this circular movement of each working arm to the aforesaid arcuate paths. This forward arcuate movement of the mounting arms is coordinated to commence as the horizontal frame is lowered towards the tire rim, and as the tire is placed in a horizontal, slightly inclined position over the rim (with the lower tire bead being placed around the external rim diameter), the mounting arms move downwardly to the tire rim and the mounting arms thence move progressively forward towards the forward edge of the working platform. In doing so, the upper shoulder on each rotatable roller engages the leading edge of the tire bead, thereby enlarging same, while the lower shoulder on the roller engages the inside diameter of the rim so as to roll therearound as the mounting arms move in their arcuate movement forwardly around the tire rim. During the foregoing process, the intermediate shoulder on the roller presses downwardly and outwardly against the upper tire bead (inside tire diameter) causing it to be pressed downwardly into position around the outside of the tire rim. As the mounting arms move forwardly in their arcuate sweep, the shoulders in the rotating rollers roll forwardly along the tire bead, expanding the tire bead and pushing the bead downwardly and inside the tire rim as a concurrent coordinated action. Once the tire is in place about the rim, the mounting arms are retracted upwardly away from the tire and rim and the inflation process is completed as these arms are so retracted. This inflation process utilizes the following described structural appurtenances.

The dual air injection system is primarily directed through the internal structure of the tire mounting block. As one air injection method, there is a conventional valve extending vertically upwardly through the tire mounting block and into a position to reach the valve stem opening for the mounted tire. As a second system, the tire mounting block has an internally disposed circular tunnel extending around the inside areas of the block in a symmetrical circumferentially disposed fashion. Extending upwardly from the upper area of the circular tunnel member are a plurality of exit jets, spaced evenly around the tunnel circumference. These jets have exit openings which are directed to the internal areas between the tire and the rim. Thus, the air can be injected inside the tire through the conventional valve system and additionally through the circular tunnel and thence through the exit jets projected into the inside areas of the tire. This dual air injection system is actuated and timed to operate as the tire is in its final stages of installation onto the tire rim. As can be seen from the latter arrangement the air injection process can be consummated as essentially a simultaneous step with the tire mounting process, and of important consideration is the fact that these simultaneous operations can be consummated on a single machine station incorporating the subject invention.

DESCRIPTION OF PREFERRED EMBODIMENT

Referring now to the drawings in which a preferred embodiment is shown, it must be emphasized that the embodiment shown in the drawings and described herein is only one specific embodiment, and that the subject invention encompasses several possible embodiments, not all of which can be described herein. Therefore, description of a preferred embodiment herein shall not be considered as delimiting the general scope of the subject invention, as set forth in the claims hereto, as other embodiments and variations are envisioned.

Moreover, in describing the preferred embodiment of the subject invention, the following reference nomenclature will be used: First, the word "lower" will refer to those areas of the machine incorporating the subject invention, that are disposed towards the floor level upon which the base rests, while the word "upper" will refer to those portions of the machine lying thereabove. The word "vertical" will be used in reference to those structures that are oriented substantially up and down above the base, while the word "horizontal" will be used in reference to those structures which are generally disposed in a direction perpendicular to the vertical orientation. The term "longitudinal central vertical axis" will refer to that axis of any part which extends vertically upward and downward through the center of the subject machine or a part thereof, dividing in a vertical direction said machine or part in a symmetrical fashion. Moreover, the word "horizontal central axis" will refer to that axis which extends horizontally and symmetrically through the center of a part or structure on the subject machine.

Figure 6:
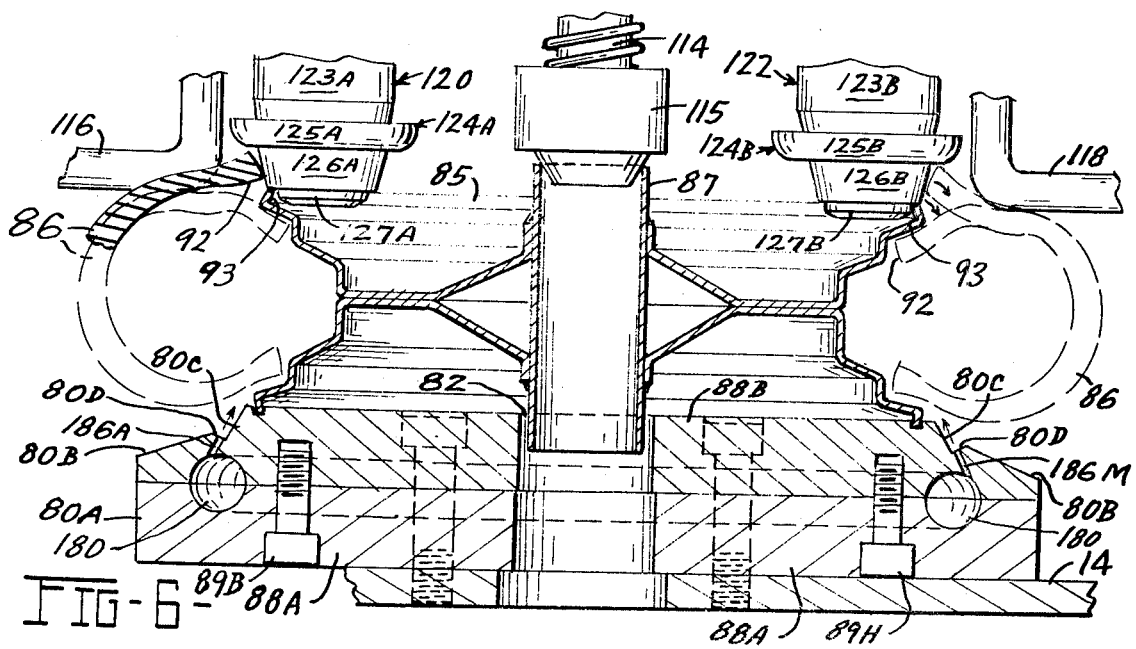
FIG. 6 is a sectional view of the mounting arms in their functional position.

The machine incorporating the subject invention is shown in FIG. 1, as tire mounting machine 10. For overall reference purposes in the ensuing description, FIG. 2 represents a tire mounting block 70 upon which a tire rim is placed for the process of mounting a flexible tire thereon. The tire to be mounted on rim 85 is affixed thereon by the mounting arms 120 and 122 shown in operation in FIG. 3. These latter mounting arms 110 and 112 move around the inside diameter of the tire in opposing and substantially semicircular movements to accomplish the process of mounting the tire on the rim 85. FIG. 4 is a drawing showing the detail of the actuating mechanism for the circular movement of the mounting arms and the detail of the circular track 129 constructed to constrain and guide the movements of the mounting arm members in their respectively designated semicircular movements. The mounting block 70 upon which the unmounted or bare rim 85 is secured for the subsequent tire mounting process is represented in a top elevational view in FIG. 5. In FIG. 6, a cross sectional view of the tire mounting block 70, the rim 85, and the mounting arms 110 and 112 reveals the functional positioning during mounting operations of the mounting arms with working rollers 120 and 122 respectively on each working arm 110 and 112. The process of placement of the rim 85 on the mounting block 70 is shown in FIG. 7, while FIG. 8 shows the rim 85 in a horizontal position for the tire mounting process, with the one rim exposed upwardly. FIG. 8 represents an alternate embodiment of a working roller, and FIG. 9 is a schematic view of the hydraulic system used in the subject invention.

Referring again in particular to FIG. 1, tire mounting machine 10 is comprised of a base member 12, which base member is adapted to rest on the floor. Most generally, base member 12 is a parallelopiped shaped member having an upper working platform 14 and a lower surface 16. It is desirable that the upper working platform 16 be flat and generally horizontal in disposition. The working platform 14 serves as the primary working surface of the subject invention, as more particularly described hereinbelow.

The subject tire mounting machine can be affixed securely to the floor through floor anchors 17A, 17B, 17C and 17D, which in turn are permanently or semipermanently affixed to the floor surface. Integrally affixed through the base member are two vertically extending pillars 20 and 22, extending from the bottom of base member 12 up through the working platform 14 through cylindrical support sleeves 23A and 23B on the working platform 14, and thence vertically upwardly above the working platform 14 of base member 12, as represented in FIG. 1. More particularly, the upwardly extending pillars 20 and 22 are mutually parallel members extending upwardly through the opposing ends of the working surface 14, as shown. Moreover, in the preferred embodiment each pillar 20 and 22 is cylindrically shaped for reasons more fully described hereinafter. These pillars 20 and 22 function as the primary support members of the working apparatus for tire mounting machine 10.

Integrally mounted on the respective upper ends of support pillars 20 and 22 is a horizontally disposed upper support beam 30. Upper support beam 30 is essentially a rectangularly shaped beam member which joins the upper ends of each pillar 20 and 22 in a supportive fashion. The undersurface 32 of beam 30 supports a vertically downwardly depending hydraulic cylinder 40. Hydraulic cylinder 40 is preferably joined to the middle area of undersurface 32 of upper support beam 30, so that such cylinder 40 is substantially equal distance from the respective end pillars 20 and 22, as readily determined from FIG. 1. Integrally affixed to the lower end of the piston 41 in hydraulic cylinder 40 is a horizontally disposed rectangular plate member 42, the lower surface of which is integrally affixed to the intermediately disposed horizontal frame member 50.

Horizontal frame 50 is adapted to be vertically slidable up and down the vertical pillars 20 and 22. More specifically, frame 50 has guide sleeves 52A and 52B affixed to the undersurface of the frame on each end thereof, as shown, which sleeves are adapted to receive and otherwise encircle respectively pillars 20 and 22. As a result, frame 50 is capable of slidable movement vertically up and down on pillars 20 and 22, as seen in FIG. 1, wherein the lowermost downward movement of frame is shown in phantom at 50A. As can be seen in FIG. 1 the intermediate sliding frame 50, as mounted on vertical pillars 20 and 22 through sleeves 52A and 52B, is slidably mounted so as to be capable of reciprocal vertical movement up and down pillars 20 and 22. The specific limits of this reciprocal vertical movement are shown in FIG. 1, as being between the uppermost position shown in full view and the lower most position being shown in phantom as position 50A. From the foregoing description, it can be seen that the intermediate reciprocation frame 50 moves up and down along sleeves in a movement which is dependent in timing and distance on the actuation of cylinder 40 affixed to the undersurface of beam. As will be described below, the working apparatus of machine 10 is integrally positioned to the undersurfce 54 of frame 50 and the downward movement of frame 50 serves to position the working apparatus into position for actual tire mounting operations, and subsequently when the mounting is completed the frame 50 moves back upwardly.

Integrally attached to the working platform 14 of base member 12 is the tire mounting block 70. Tire mounting block 70 is a circular member integrally disposed in a horizontal manner and flush against the working platform 14 midway between the pillars 20 and 22. More particularly, the mounting block 70 is semipermanently affixed to the working platform 14 of base 12, so as to be immovable relative thereto. Moreover, in reference to FIG. 5, mounting block 70 has four circular threaded openings 74A, 74B, 74C and 74D to receive appropriate locking screws to semipermanently affix the mounting block 70 to the working platform 14. The peripheral circumferential edge of the mounting block is comprised of multiple shoulders each with a different slope or gradient. More particularly, mounting block 70 has three distinct shoulders 80A, 80B and 80C, as shown in FIG. 6. The radially outer shoulder 80A has a gradient of ninety degrees, as it extends vertically upward perpendicular to the working platform 14. This shoulder 80A rises from the working platform 14 until it meets radially intermediate shoulder 80B. Radially intermediate shoulder extends radially inwardly from the top of radially outer shoulder 80A at a gradient of about thirty degrees, as readily seen in FIG. 6. At the radially inner end of shoulder 80B, said latter shoulder drops downward a short distance as it extends radially inwardly, this short downwardly sloping ridge 80D is not technically considered a shoulder, however, the third shoulder 80C is the radially inner shoulder and it commences at the radially inner extent of ridge 80D and slopes upwardly at a gradient of approximately forty-five degrees as it extends radially inwardly. Radially inner shoulder ends at the top, horizontal surface 84 of tire mounting base 70. The radially inner shoulder 80C has a slope, in any event, which is steeper than that of intermediate shoulder 80B. In the center of the tire mounting block is a depressed cylindrically shaped depression 82 adapted to receive a hollow member such as a wheel or tire rim hub of conforming diameter.

As seen in FIGS. 2 and 6, a base tire rim 85 of conventional constructional configuration with hub 87 is inserted on the tire mounting block 70 such that the tire rim 85 lies horizontally on tire mounting block with the one side of the rim being flush, in such horizontal position, against the upper surface of the tire mounting block 70, as shown. In such position rim hub 87 is inserted conformingly in depression 82 in block 70. It is in this latter position that a tire is placed on the rim 85, such a tire being shown in phantom in FIGS. 1 and 6, and again in FIG. 9.

In reference again to FIGS. 5 and 6, it is to be noted that the circular tire mounting block can be constructed as a two unit structure, although such a constructional configuration is not considered essential. In particular, tire mounting block 70, as shown for the preferred embodiment, is comprised of two separate circular plates, 88A and 88B, respectively the lower and upper plate members. Circular plate 88A is essentially a flat, regularly shaped plate, with side walls which are vertical, comprising most of shoulder 80A. The upper plate 88B is also circular, but with the sloping sides which form the upper part of shoulder 80A, and all of the sloping shoulders 80B and 80C. Upper and lower plates are secured to one another by a plurality of bolt members 89A, 89B . . . 89J extending upwardly through appropriately machined receptacle openings extending from the bottom of the lower plate member 88A.

As can be seen in FIGS. 1 and 3, depending downwardly from the undersurface of horizontal frame 50 are vertically disposed mounting arms 110 and 112. These two mounting arms 110 and 112 are longitudinally extending members and are parallel to one another, with a vertically depending positioning arm 114 disposed centrally between said two mounting arms, as shown. This cylindrically shaped, longitudinally extending member serves both to center the tire rim and to hold tire rim down against the mounting block as the tire mounting process is completed. Integrally attached and spring mounted on the bottom end of positioning arm 114 is a cylindrically configured centering post 115, the bottom end of which is adapted to seat in the upper end of tire rim hub 84, as represented in FIG. 6. More particularly, the centering post is spring loaded on positioning arm 114 such that it can move axially and resiliently up and down on positioning arm 114 in its precise centering and positioning operations.

The mounting arms 110 and 112 are also of cylindrical and longitudinally extending configuration. The longitudinal central axis of each mounting arm 110 and 112 is substantially perpendicular to the working platform 14, as seen in the drawings. Affixed and keyed to each working arm 110 and 112 is a laterally extending L-shaped tire holding arm 116 and 118 respectively, as shown in FIGS. 1, 3 and 6. These laterally extending tire holding arms are integrally attached approximately at the middle of each corresponding mounting arm 110 and 112, with a leg of such holding arm 116 and 118 depending vertically downwardly along the side of the arm for a distance to the corresponding mounting arm. As can readily be seen in FIGS. 3 and 6 at the bottom of the matching mounting arm 110 and 112, the respective tire holding arm 116 and 118 projects perpendicularly in L-shaped fashion, this perpendicular leg extending a distance substantially equal in length to the aforesaid vertical leg component. The functional aspects of tire holding arms 116 and 118 will be discussed in detail hereinbelow.

Fitted in semipermanent fashion of the bottom of each tire mounting arm 110 and 112 are tire mounting rollers 120 and 122 respectively. These rollers 120 and 122 are rotatably mounted on the bottom of such arms so as to be freely rotatable about the vertical longitudinal central axis of each mounting arm. Each roller 120 and 122 is substantially cylindrically shaped on its upper portions 123A and 123B respectively, and bell-shaped on its lower portions 124A and 124B respectively. Specifically, the lower bell-shaped portion of each mounting roller is comprised of three distinct shoulders, each with a different diametric extent and configuration. In particular, referring to roller 120, the uppermost shoulder 125A, is a circular flanged shoulder with a rounded, convex configuration on its downwardly facing side and a flat surface on its upper surface. Flanged shoulder 125A has a diameter, as seen, which is greater than the diameter of any other part of the roller 120. Middle shoulder 126A is rounded in a convex fashion and is smaller in diameter than flanged shoulder 125A the diameter of which decreases as it extends downwardly. The bottom shoulder 127A has the smallest diameter of the three shoulders, and moreover there is a sharp break between bottom shoulder 127A and middle shoulder 126A, as shown. In similar manner, shoulders 125B, 126B and 127B on mounting roller 122 are constructed as shoulders 125A, 126A, and 127A on mounting roller 120, as shown in FIG. 6.

Integrally positioned on the undersurface 51 of frame 50 is a circular track 129 functioning to both hold and control the movements of the mounting arm members 110 and 112.

More particularly, the circular track 129 is horizontally disposed so that the plane formed by its circular path lies parallel to the plane of the upper working surface 14 of base member 10. In constructing the preferred embodiment of the subject invention it is considered optimal to construct the circular track with a diameter which is just slightly larger than the largest rim of the various tire sizes to be mounted with the subject machine, however, this latter described feature is not considered critical or necessary to the operational ability of the subject invention.

The upper ends of the mounting arms 110 and 112 are indirectly mounted (as described below) in the circular track 129 so that the sweeping, circular movements of the mounting amrs are controlled by the track configuration and curvature. A horizontally and rearwardly extending support plate 43 is integrally affixed to the posterior side of the sliding frame 50, as shown in FIGS. 1 and 4. More specifically, plate 43 of flat disposition extends rearwardly from the intermediate slidable frame member 50 whereby it lies at approximately the same horizontal level as the intermediate frame 50, as shown. In particular reference to FIG. 4, which is, as noted, an elevational view of the circular track, viewed from the bottom (as if looking up thereat from working platform 14) a horizontally positioned hydraulic cylinder 131 is affixed to the undersurface of plate 42. The push rod 132 of cylinder 131, projecting in an anterior, as opposed to posterior, direction is connected to a clevis pivot member 133, mounted in bushing 134, to which clevis member is pivotally mounted two horizontally extending connecting rods 135A and 135B. More particularly, the clevis pivot member 133, when also viewed in FIG. 3, is desirably constructed as a U-shaped member through which is inserted a freely rotatable member 136. The connecting rod members 135A and 135B are of general cylindrical configuration except in those areas of rods 135A and 135B adjacent to where the connecting arms are joined at clevis pivot member 133. Specifically, at the latter areas each connecting rod 135A and 135B is semicircular, with half of its diametrical extent cut off, so that the respective rods 135A and 135B, at this juncture, have opposing flat surfaces to facilitate one rod sliding over the top of the other in an articulative fashion, at this pivot juncture. This latter arrangement avoids interference between the two connecting rod members when they are actuated, as described more fully hereinafter.

As shown in FIGS. 3 and 4, the hydraulic piston 131 is disposed horizontally in the platform 43 so that when said cylinder is actuated, it causes the piston rod 132 to move forward, in a horizontal plane just beneath platform 43. As said piston rod 132 moves forward, it exerts force on clevis 133, in turn causing the clevis pivot member to move forwardly in the same direction as piston rod 132.

As the clevis pivot member 133 moves forward, to the left in FIGS. 3 and 4, the forward movement of the clevis exerts such forward directional force on the right or posterior ends of the connecting rods 135A and 135B. The forward, horizontally directed force vector on the ends of connecting rods 135A and 135B causes them to move forwardly also, but because of the clevis connection, the connecting rods 135A and 135B will diverge from one another as they move forward. A more detailed description of the construction and interrelationship of said connecting rods is set forth immediately below.

Each connecting rod 135A and 135B extends horizontally forwardly from pivot member 133, with the connecting rods forming a conjoined V-shaped appendage as shown in FIG. 4. Integrally mounted on the respective ends of connecting arms 135A and 135B are the mounting arms 110 and 112. More precisely, at the end of connecting rod 135A is integrally mounted a sleeve member 136A, into which is rotatably mounted vertically depending working arm 110. The sleeve 136A is joined in a perpendicular manner to the working arm 110 at an area between the joinder point of tire holding arm 116 and circular track 129. In similar manner, mounting arm 112 is rotatably mounted in sleeve 136B affixed on the end of connecting rod 135B.

As is graphically indicated in FIG. 3, the connecting rods 135A and 135B join the vertically depending mounting arms 110 and 112 at a height which is approximately just above the middle of such mounting arms. Rotatably mounted on the respective upper ends of mounting arms 110 and 112 are upper bushings 140A and 140B of cylindrical disposition. Integrally affixed to these bushing members 140A and 140B are horizontally disposed, and longitudinally, extending guide arms 145A and 145B. Guide arms 145A and 145B have at the respective ends opposite to the bushing members 140A and 140B, roller members 147A and 147B mounted therein which are equipped to roll around the inner guide rails of circular track 129 indicated and represented in FIGS. 3 and 4. As stated, guide arms 145A and 145B are rotatably mounted to working arms 110 and 112 respectively through bushings 140A and 140B, and by this feature move the mounting arms 110 and 112 in a mutually complementary circular path, such path originating at the position to the right shown in FIG. 4, to the positions shown on the left, in phantom, in the same figure. More specifically, referring to FIGS. 3 and 4, as the hydraulic cylinder 131 is actuated, the rod 132 is thrust forward, moving forward as a result the clevis pivot member 133. As the pivot member 133 rides forward, it pushes connecting rods 135A and 135B forward, also to the left in FIG. 4, and as rods 135A and 135B move forward, each will diverge from one another. This forward movement of the connecting rods 135A and 135B causes in turn working arms 110 and 112 to move forward also, but the forward movement of working arms 110 and 112 is constrained and controlled by the effect of guide arms 145A and 145B. Specifically, since guide arms 145A and 145B are in turn restrained in their respective movements by the roller members 147A and 147B engaging the track 129, the net effect is that each mounting arm 110 and 112 each move forward in a semicircular sweep; one mounting arm 110 moving counterclockwise, as viewed in FIG. 4, while the other arm moves in a complementary, but opposite, clockwise sweep, as shown. The resultant movement of the respective mounting arms 10 and 112 is an approximate 120 degree sweep for each arm, and these respective movements function, as will be discussed, as a part of the tire mounting process to install the tire bead around the complete circumference of the tire rim.

As seen in FIG. 4, the guide arms 145A and 145B extend radially inwardly a short distance from the bushings 140A and 140B and these extensions 148A and 148B are integrally affixed to a sleeve 149 conjoined rotatably around the top of the positioning arm 114 through sleeve 149. Moreover, machined into each guide arm extension 148A and 148B is a longitudinally extending slot, 150A and 150B which lies parallel to the longitudinal central axis of each respective guide arm 145 and 145B. These slots receive and allow for longitudinal extension or contraction of the guide arms 145A and 145B so that a shortening or lengthening the latter arms serves to decrease or increase, as desired, the effective diameter of the sweep of mounting arms 110 and 112 for different tire diameters.

In mounting the tire 86 on the rim 85, it is essential that the mounting rollers move through a total cooperative circular sweep that approaches 270°; this means that the total arcuate sweep of each mounting roller should be about 120° arcuate distance, with each roller 120 and 122 on each mounting arm moving in opposing arcuate directions from the starting positions shown to the left in FIG. 4. Thus, when the mounting arms 110 and 112 are moved forwardly by connecting rods 135A and 135B, one arm 110 will move counterclockwise from the position shown in FIG. 4, through the arcute path schematically shown in FIG. 4, 120° to a position shown in phantom to the right in FIG. 4. Similarly, mounting arm 112 will move 120° in an arcuate path in a clockwise direction over the path shown schematically, as shown, reaching the position on the left shown in phantom. These respective complementary motions of the mounting arms 110 and 112 will cause the mounting rollers to move a corresponding path, and direction, as part of the tire mounting process, more fully described below. As indicated in FIG. 4, as the guide arm 145B moves forward in its described arcuate path, it will hit limit switch 149 causing same to actuate the air inflation process described below. As indicated in FIG. 4, the limit switch 149 is affixed to the front undersurface of frame 50.

The above described circular movements of the mounting arms 110 and 112 are designed to create an effective circumferential evolutionary and working movement of said arms about the upper circumferential periphery of the tire rim 85. By using this circumferential movement, each mounting arm serves to progressively place the upper bead of a horizontally disposed tire over the upper circumference of the rim. This placement of the tire over the rim thus progresses circumferentially in a progressive manner on each side of the rim, as discussed below.

In positioning a tire 86 on a rim 85, as shown in FIGS. 7 and 8, the rim 85 is placed on the tire mounting block 70, as shown in the position in these two indicated drawings. Once the rim 85 is placed horizontally on the tire mounting block, a tire is placed over the rim in an inclined position as shown in FIG. 7, surrounding a portion of the tire rim, with one portion of one side thereof resting on the top surface of the working platform 14 adjacent the rear of the platform. The other end of the tire is inclined upwardly so that the lower side of the tire, near such upper inclined end, rests on the top front side of rim 85, as shown. Once the tire 86 is so positioned the hydraulic cylinder 40 is actuated. This in turn causes the sliding frame 50 to be lowered, as shown in FIG. 1. This downward movement of frame 50 in turn lowers the mounting arms 110 and 112, along with the positioning of arm 114, and as the depending actuator arm 159 on frame 50 passes limit switch 160, mounted on vertical stanchion at the rear of working platform 14, it causes thereby cylinder 131 to be actuated. Once cylinder 131 is actuated, as discussed above, vertical mounting arms 110 and 112 move forward in the respective complementary semi-circular motions as discussed above. Additionally, as the mounting rollers 120 and 122 move downwardly, the lower side of each upper roller shoulder 125A and 125B respectively engage the leading edge of the inside diameter of the tire or tire bead 92, as shown in FIG. 7, while the bottom shoulder 127A and 128B engages the inside of the outer edge of the upper exposed tire rim, as shown in FIG. 6. By this latter feature, the mounting rollers 120 and 122 will always ride inside the upper rim diameter, with the bottom shoulder riding against the inside of the rim, thus keeping the rollers always inside and above the tire rim, and not between the outside of the tire rim 85 and the tire bead. The intermediate shoulder 126A and 126B urges the tire bead radially outwardly beyond the rim periphery while lateral tire holding arms 116 and 118 push or hold the tire down as it is being mounted, as seen in FIG. 6. Thus, as rollers 120 and 122 move downwardly and rotate upon the forward movement of mounting arms 110 and 112, the forward rolling motion of rollers 120 and 122 along the rim 85 and tire bead 92 causes the tire to be progressively installed in a circumferential manner, from front to back of the rim, around the rim 85 without requiring the rollers 110 and 112 to be positioned at any time between the tire and the rim. Thus, in specific functional disposition, each roller has several purposes. First, the lower face of upper shoulders 125A and 125B engages the leading edge of the tire bead and thence pushes it downwardly beneath the rim diameter. Middle shoulder 126A and 126B on each roller continues to urge the tire bead radially outwardly so that the tire bead will fit around the rim diameter, and lower shoulder 127A and 127B functions to keep the roller inside the rim diameter, so that it does not get positioned between the tire rim and the tire and interfere with the mounting process.

The foregoing constructional arrangement for the rollers 120 and 122 together with the other characteristics of the tire mounting machine 10 described herein provides a flexible machine assembly which is adaptable for mounting tires of a wide range of sizes on rims on a broad range of shape and size. In this regard, the tire mounting machine 10 as representing the preferred embodiment of the subject invention is constructed primarily for the installation of tires on rims of smaller diameters, such as small tractors or wheelbarrow tires. However, with very minimal or slight modifications the tire mounting machine 10 can be used to install tires of any size or configuration on drop center rims, as used in the automotive industry. In the event of installation of tires on drop center rims, the salient working and mounting elements, as described above, will remain unaltered in basic structure.

The tire mounting block 70 incorporates two physical elements for the air inflation process. These two features allow a tire 86, once installed on the rim 85, to be inflated almost instantaneously as the final stages of the installation process is being completed. This latter simultaneous feature obviates the necessity of a separate step or machine station for this inflation process.

The specific physical features of this dual tire inflating system, are as stated, incorporated in the tire mounting block 70, with the following described elements. A vertically upwardly extending air hose 170 rises from a compressed air source, not shown, up through base member 12, and has an opening thereon which is joined to air inlet 172, as shown in FIG. 2. The air inlet 172 is aligned with the valve 178 in rim 85, so that as compressed air is passed through hose 170 it is directed immediately to the areas inside the tire, between the rim 85 and the tire 86. The latter system serves as the primary air injection system for tire mounting machine 10. A supplementary air injection system is provided as follows: A circular channel 180 of cylindrical disposition is integrally machined into the internal areas of tire mounting block 70, as shown in FIGS. 5 and 6. This circular channel 180 is a continuous circular tunnel which communicates with a upwardly extending air hose member 182, also connected to the air pressure source in base member 12. The circular tunnel member 180 in turn communicates with a plurality of upwardly extending ventricles (jets) 186A, 186B . . . 186Z to areas outside the mounting block 70. These ventricles are spaced from one another in a uniform manner around the block 70 and such ventricles extending upwardly from tunnel 180 between shoulders 80B and 80C, as shown in FIG. 6. More particularly, each ventricle 186A . . . 186Z extends in an inclined direction, inwardly and upwardly from tunnel 180 in a direction which is parallel and aligned with the outer extremity of radially inner shoulder 80B as shown in FIG. 6. By this latter constructional relationship, air passing upwardly from air hose 182, passes directly to channel 180 and thence around such channel and subsequently up through ventricles 186A, 186B . . . 186Z. As can be seen as the air passes upwardly the ventricles 186A, 186B . . . 186Z, the air will flow directly along the side of radially inner shoulder 80B, into the inside areas between the bottom bead of the tire 86 and the tire rim 85, as schematically represented in FIG. 6. As can be seen by this dual air injection arrangement, very minimal amounts of air will be wasted because of the direct vectoring of the air flow through the ventricles 186A, 186B . . . 186Z, up directly to the areas inside the tire and the rim. Moreover, the air injection system is automatically timed to be generated upon actuation of the same limit switch 160 which actuates the downward movement of the working arms 110 and 112.

The tire mounting machine 10, as shown, is operated electrically, with appropriate electrical control systems situated in control box 200, shown in FIG. 1. The operational movements of all moving machine elements are actuated through a hydraulic system schematically represented in FIG. 10. In particular, a reservoir tank 204 is located in base 12, with motor 206 and pump 208 connections also located at the bottom inside of the base member 12 as shown. Hydraulic cylinders 131 and 40 are appropriately coordinated for actuation in the subject machine through the closing of limit switches 149 and 161 shown in the drawing. The operational features and constructional characteristics of the foregoing hydraulic system is generally of conventional disposition.

The foregoing described tire mounting invention, as described thusly adaptable for use in installing any type of tire on any type of rim, with minor modifications being appended. For example, as shown in FIG. 9, the subject machine can be used on reverse flange rims also. As noted, the subject invention utilizes novel mounting rolling structures along with simultaneous air injection devices to render the tire mounting process more efficient. Moreover, the foregoing described invention is only one embodiment of several potential structures, and the following claims are not to be limited by the specific description of one such embodiment.

I claim:

1. A tire mounting machine for mounting a flexible tire on a tire rim comprising in combination:
   (a) a base member adapted to rest on the floor;
   (b) vertical support members extending vertically upwardly through said base member;
   (c) vertically reciprocating means with an upper and lower side on said vertical support members adapted to reciprocate up and down on said vertical support members;
   (d) tire mounting arms, each with a vertical central axis, affixed on the underside of said reciprocating means, said tire mounting arms being mounted slidably in circular track members to said underside for arcuate movement of each tire mounting arm;
   (e) tire mounting rollers rotatedly mounted for coaxial movement about the vertical central axis of said tire mounting arms, each said roller member having plurality of shoulder members of variable diameter thereon;
   (f) means on said base member for receiving and holding a tire rim for the tire mounting process;
   (g) means to actuate said tire mounting arms for the installation of a tire on a tire rim.

2. A tire mounting machine for mounting a flexible tire on a tire rim comprising in combination:
   (a) a base member with an upper working surface;
   (b) vertical support members extending vertically upwardly through said base member;
   (c) a vertically reciprocating member with an upper and lower side slidably mounted on said vertical support members, and adapted to reciprocate vertically up and down on said vertical support members;
   (d) tire mounting arms affixed on the underside of said reciprocating means, said tire mounting arms being mounted on the lower side of said vertically reciprocating member;
   (e) holding means integrally attached to the upper working surface of the base member, said holding means adapted to receive and hold a rim for installation of a tire therein;
   (f) dual air chamber means in said holding means adapted to receive compressed air and channel same through a plurality of exit ventricles into the areas between the tire and the rim;
   (g) means to actuate said tire mounting arms for the installation of a tire on a tire rim.

3. A tire mounting machine for mounting a flexible tire on a tire rim comprising in combination:
   (a) a base member with an upper working surface;
   (b) vertical support members extending vertically upwardly through said base member;
   (c) a vertically reciprocating member with an upper and lower side slidably mounted on said vertical support members, and adapted to reciprocate vertically up and down on said vertical support members;
   (d) tire mounting arms affixed on the underside of said reciprocating means, said tire mounting arms being mounted on the lower side of said vertically reciprocating member;
   (e) holding means integrally attached to the upper working surface of the base member, said holding means adapted to receive and hold a rim for installation of a tire therein;
   (f) dual air chamber means in said holding means adapted to receive compressed air and channel same through a plurality of exit ventricles into the areas between the tire and the rim;
   (g) means to actuate said tire mounting arms for the installation of a tire on a tire rim;
   (h) roller means affixed on the end of each said tire member arms, said roller means having a variable diameter throughout its vertical extent.

4. A tire mounting machine for mounting a flexible tire on a tire rim comprising in combination:
   (a) a base member with an upper working surface;
   (b) vertical support members extending vertically upwardly through said base member;
   (c) a vertically reciprocating member with an upper and lower side slidably mounted on said vertical support members, and adapted to reciprocate vertically up and down on said vertical support members;
   (d) tire mounting arms affixed on the underside of said reciprocating means, said tire mounting arms being mounted on the lower side of said vertically reciprocating member;
   (e) holding means integrally attached to the upper working surface of the base member, said holding means adapted to receive and hold a rim for installation of a tire thereon;
   (f) dual air chamber means in said holding means adapted to receive compressed air and channel same through a plurality of exit ventricles into the areas between the tire and the rim;
   (g) means to actuate said tire mounting arms for the installation of a tire on a tire rim;
   (h) roller means affixed on the end of each said tire member arms.

5. A tire mounting machine, as described in claim 4 in which the roller means comprises a roller with an enlarged circumferential shoulder which slopes inwardly as it extends downwardly.

* * * * *